US009778089B2

(12) United States Patent
Edvardsson (10) Patent No.: US 9,778,089 B2
(45) Date of Patent: Oct. 3, 2017

(54) MULTI-CHANNEL GUIDED WAVE RADAR LEVEL GAUGE

(71) Applicant: Rosemount Tank Radar AB, Gothenburg (SE)

(72) Inventor: Olov Edvardsson, Linkoping (SE)

(73) Assignee: Rosemount Tank Radar AB, Gothenburg (SE)

( * ) Notice: Subject to any disclaimer, the term of this patent is extended or adjusted under 35 U.S.C. 154(b) by 474 days.

(21) Appl. No.: 14/318,982

(22) Filed: Jun. 30, 2014

(65) Prior Publication Data

US 2015/0377678 A1 Dec. 31, 2015

(51) Int. Cl.

| G01F 23/284 | (2006.01) |
|---|---|
| H01P 5/16 | (2006.01) |
| H01Q 1/22 | (2006.01) |
| H01Q 1/50 | (2006.01) |
| G01F 23/00 | (2006.01) |
| G01S 7/292 | (2006.01) |

(Continued)

(52) U.S. Cl.
CPC ........ G01F 23/284 (2013.01); G01F 23/0069 (2013.01); G01S 7/292 (2013.01); G01S 7/4017 (2013.01); G01S 13/88 (2013.01); H01P 5/16 (2013.01); H01Q 1/225 (2013.01); H01Q 1/50 (2013.01)

(58) Field of Classification Search
CPC .. G01F 23/284; G01F 23/0069; G01S 7/4017; G01S 13/88; G01S 7/292; G01S 13/08; H01P 5/16; H01Q 1/50; H01Q 1/225
USPC .................. 342/73, 290, 124, 118
See application file for complete search history.

(56) References Cited

U.S. PATENT DOCUMENTS 5,651,286 A * 7/1997 Champion ............ G01F 23/284
324/642
5,656,774 A * 8/1997 Nelson .................. G01F 23/284
73/290 V (Continued)

FOREIGN PATENT DOCUMENTS

| DE | 199 49 992 | 10/2001 |
|---|---|---|
| DE | 10 2007 061 573 | 6/2009 |

(Continued)

OTHER PUBLICATIONS

Notification of Transmittal of the International Search Report and the Written Opinion of the International Searching Authority, from PCT/EP2015/064465, dated Sep. 9, 2015.

*Primary Examiner* — Timothy A Brainard
(74) *Attorney, Agent, or Firm* — Westman, Champlin & Koehler, P.A.

(57) ABSTRACT

A level gauge for detecting process variables related to a distance to a surface of a content in a tank, includes a first and second functionally independent circuitry arrangements comprising transceiver circuitry and processing circuitry. The gauge further comprises a power divider providing isolation between signals having the same propagation mode, a single wire transmission line probe, and a matching arrangement providing an electrically matched connection between the electrical connection of a process seal and the single wire transmission line probe. A combination of a power divider with a matching arrangement allows multiple channels on one single wire transmission line probe.

24 Claims, 4 Drawing Sheets

(51) Int. Cl.
  *G01S 7/40* (2006.01)
  *G01S 13/88* (2006.01)

(56) References Cited

U.S. PATENT DOCUMENTS

| | | | | |
|---|---|---|---|---|
| 5,943,908 A * | 8/1999 | Innes | | G01F 23/284 324/632 |
| 6,414,625 B1 | 7/2002 | Kleman | | |
| 6,765,524 B2 | 7/2004 | Kleman | | |
| 6,922,150 B2 * | 7/2005 | Håll | | F17C 13/021 340/612 |
| 7,106,247 B2 * | 9/2006 | Edvardsson | | G01S 7/03 342/118 |
| 7,265,558 B1 * | 9/2007 | Penndal | | G01F 23/284 324/637 |
| 7,498,974 B2 * | 3/2009 | Nilsson | | G01F 23/284 324/600 |
| 7,636,059 B1 | 12/2009 | Edvardsson | | |
| 7,701,385 B2 * | 4/2010 | Edvardsson | | G01F 23/284 342/124 |
| 7,826,309 B2 * | 11/2010 | Spanke | | G01F 23/28 367/908 |
| 8,773,302 B2 * | 7/2014 | Edvardsson | | G01F 23/284 342/118 |
| 8,872,695 B2 * | 10/2014 | Edvardsson | | G01F 23/284 342/124 |
| 9,086,310 B2 * | 7/2015 | Hoferer | | G01F 23/28 |
| 2002/0121907 A1 * | 9/2002 | Griessbaum | | G01F 23/284 324/642 |
| 2004/0036617 A1 * | 2/2004 | Hall | | F17C 13/021 340/612 |
| 2004/0099058 A1 * | 5/2004 | Edvardsson | | H01Q 1/22 73/290 V |
| 2007/0090992 A1 * | 4/2007 | Edvardsson | | G01F 23/284 342/124 |
| 2009/0033543 A1 * | 2/2009 | Nilsson | | G01F 23/284 342/124 |
| 2009/0273506 A1 * | 11/2009 | Delin | | G01F 23/284 342/124 |
| 2009/0289835 A1 * | 11/2009 | Edvardsson | | G01F 23/284 342/124 |
| 2009/0303106 A1 * | 12/2009 | Edvardsson | | G01F 23/284 342/124 |
| 2010/0123614 A1 | 5/2010 | Nilsson | | |
| 2010/0156702 A1 * | 6/2010 | Edvardsson | | G01F 23/284 342/124 |
| 2012/0137768 A1 * | 6/2012 | Edvardsson | | H01Q 1/225 73/290 V |
| 2012/0324994 A1 | 12/2012 | Welle et al. | | |
| 2013/0009803 A1 * | 1/2013 | Edvardsson | | G01F 23/284 342/124 |
| 2014/0085132 A1 * | 3/2014 | Jirskog | | G01F 23/284 342/124 |
| 2014/0203889 A1 * | 7/2014 | Lewis | | H01P 5/16 333/136 |

FOREIGN PATENT DOCUMENTS

| | | |
|---|---|---|
| WO | WO 03/025523 | 3/2003 |
| WO | WO 2005/062000 | 7/2005 |

\* cited by examiner

MULTI-CHANNEL GUIDED WAVE RADAR LEVEL GAUGE

FIELD OF THE INVENTION

The present invention relates to a multi-channel radar level gauge using electromagnetic waves guided by a guided wave probe into a tank to determine a distance to a surface of a product in the tank.

BACKGROUND OF THE INVENTION

Radar level gauging (RLG) is an increasingly important method for level gauging in tanks, containers, etc. A radar level gauge typically includes transceiver circuitry and processing circuitry which is connected to a propagation device adapted to allow propagation of electromagnetic signals into the tank. An example of such a systems is disclosed in U.S. Pat. No. 7,106,247 by the same applicant.

The signal propagating device may be a directional antenna. However, in some applications radar level gauges using antennas to provide free propagating signals are not suitable, and a wave guiding structure is used to guide the waves. Based on propagation mechanism three different types of wave guiding structures are known in the prior art.

Wave guides of the first type are hollow (e.g. a pipe of suitable cross section) and "thick" in the sense that they have a cross section of half a wavelength or more, possibly reduced by a dielectric filling. The electromagnetic fields in such a waveguide always have at least one field component along the direction of propagation. When used in radar level applications, wave guides of this type are referred to as "still pipes", and must be perforated to get the same liquid level inside as outside.

Wave guiding structures of the second type are transmission lines with two or more conductors, such as a twin line or a coaxial line. Transmission line wave guides have a diameter much smaller than the wavelength of the transmitted waves, and one typical feature is that the electromagnetic fields are transverse or of TEM-type (Transverse Electro-Magnetic fields). A twin line with two stainless wires and sparse dielectric separations is one practical example. For practical level gauging applications using signals below 1 GHz (with wavelength above 300 mm) a transmission line diameter (or maximum transversal measure) of 3-20 mm is commonly used. A too small diameter will increase resistive losses and may cause problems with material clogging and mechanical strength.

Finally, wave guiding structures of the third type are surface wave guides (SWGs), such as a single wire transmission line or tube with or without dielectric coating. A surface wave guide can be very thin as compared to the wavelength (4-8 mm is a common SWG diameter for use below 1 GHz) but they also have field along the propagation direction and also fields well outside of the SWG. In contrast to the transmission line probe of TEM type it needs more space free as there are fields more distant from the wire. In case of a single metal wire, a poor electric conductor such as stainless steel is suitable. The single wire probe is very practical and robust to use for level gauging and has lower attenuation per meter than for example a twin wire made of the same type of conductor.

Wave guiding structures of the second and third type thus both have a diameter much smaller than the wavelength of the transmitted waves. In radar level gauging applications such waveguides are normally referred to as "probes", and the detection principle is sometimes referred to as guided wave radar (GWR). The most common type today uses short pulses (around 1 ns) without carrier and occupy a frequency range of roughly 0.1-1 GHz.

Due to safety restrictions, environmental laws and requirements, etc, there is often a need for several measurements of the surface level of the medium in the container, which measurements are completely separated and functionally independent from each other. For example, in radar level gauging systems for a tanker's load containers, at least one alarm function (e.g. overfill alarm) that is functionally independent of the level measuring system is required.

Functional independence not only requires separate units but also means that a fault in one system does not render the other system(s) to be degraded or inoperative. Such independence can be achieved by ensuring that there are no common electrical circuits and cabling, i.e. there must not be any galvanic contact between different measuring systems. One way to achieve this is to simply install at least two complete independent level gauges.

However, in recent years, the cost for the mechanical installation of a radar level gauge has increased faster than the cost for the electronics in the gauge. To let two or more electronics units use the same signal propagating device, such as an antenna, is therefore cost efficient and advantageous, provided that the common parts can be assumed to have very high reliability. Such systems have shown to be successful on the market, especially as various safety regulations often require redundancy in critical functions. When some parts (like antenna or a still pipe) are shared by two level gauges the design must be done to maintain sufficient electrical isolation between the two gauges. If the faulty level gauge should generate unusual signals or present unusual impedance the circuits should be done to isolate the correct gauge from disturbances which might degrade the other unit outside of its specification.

The prior art, illustrated for example by U.S. Pat. No. 6,414,625, 6,765,524 and US 2013/0009803, typically relates to systems where a plurality of gauges share a common signal propagation device, and provide two or three different functions, e.g. level gauging and high level alarm. On the signal side of the gauges, a power supply and signal interface, typically provided together by two wires (a so called bus), may be shared by the gauges or be provided separately (the latter case is often referred to as "galvanically separated" installations). In case of a standardized bus, the connection is specified to be such that an arbitrary error in one unit does not interfere with the connection of the other. The type testing procedure for the bus connection among other ensures that such a failure is very unlikely.

On the radar side of the gauges, there is a similar requirement that a dysfunctional gauge must not interfere with another gauge. This requirement has so far in practice limited the available solutions for connecting several gauges to a single propagating device to solutions involving different and distinguishable signals or propagation modes. For example, patents '625 and '524 (mentioned above) disclose two or more radar channels connected to an antenna, where the signals are distinguishable e.g. by having different polarization modes. The more recent US2013/0009803 (also mentioned above) discloses connecting two electronics units to a GWR probe with different propagation modes (e.g. a TEM mode and a surface wave guide mode or more than one TEM-mode in a multi-conductor probe). In both these cases, the isolation between the different modes can relatively easily be ensured to exceed the required approximately 20 dB. With around 20 dB or more suppression, typical level gauging signal processing must be able to neglect disturbances. The typical echo signal for a radar level gauge sometimes contains disturbances of that order. Thus any typical signal processing has to handle disturbances of that order.

In summary, the prior art suggests using a propagation device (antenna, hollow waveguide or multimode transmission line) allowing more than one propagation mode (or polarization) and corresponding coupling structure to provide sufficient isolation between the two or three independent level gauging functions. If a single wire probe is used there is only one propagation mode available and prior art solutions cannot be used. It is possible to separate signals having distinguishable signal features (like stated in '625 above) but it is not possible to surely know the signals from an electronic unit dysfunctional in an unspecified way. In the last case measures have to be taken to ensure sufficient isolation between a faulty unit and a correct one.

So far, there are no known solutions which allow connection of multiple gauges to a single wire transmission line probe with sufficient isolation between the gauges to make the units sufficiently independent if abnormal function should occur in one unit. The methods used in some bus connections on the signal side involve big signal attenuation and the small power margins do not allow them to be copied on the radar side.

General Disclosure of the Invention

It is an object of the present invention to provide a multi-channel level gauge using a single wire transmission line probe.

This and other objects are achieved by a level gauge comprising a first circuitry arrangement with first transceiver circuitry for transmitting first electromagnetic transmit signals and receiving first electromagnetic echo signals, and first processing circuitry connected to the first transceiver circuitry for determining a first process variable, and a second circuitry arrangement with second transceiver circuitry for transmitting second electromagnetic transmit signals and receiving second electromagnetic echo signals, and second processing circuitry connected to the second transceiver circuitry for determining a second process variable. A power divider is electrically connected to the first transceiver circuitry and to the second transceiver circuitry to provide signal isolation between the first transceiver circuitry and the second transceiver circuitry. A process seal provides a sealed electrical feed-through from the power divider through a tank wall, the electrical feed-through having an electrically matched connection with the power divider. The gauge further comprises a single wire transmission line probe mechanically suspended by the process seal and extending into the content in the tank, the single wire transmission line probe being adapted to guide the transmit signals towards and into the content, and to guide reflected signals back to the first and second circuitry arrangements. The electrical feed-through has a first input impedance as seen from the probe, and the single wire transmission line probe has a second input impedance as seen from the electrical feed-through, and a matching arrangement is arranged to provide an electrically matched connection between the electrical feed-through and the single wire transmission line probe.

It is noted that the term power "divider" is used, although its function is to act as a gateway between the two circuitry arrangements and the one single probe, while maintaining electrical isolation between the two circuitry arrangements and the first and second transmit signals.

It is also noted that both transmit signals, after passing the power divider, are connected to one single electrical feed-through in the tank wall.

The single wire transmission line probe is typically a surface wave guide along which signals can propagate only in one and the same propagation mode.

The power divider essentially ensures sufficient isolation between the two transceivers and the two circuitry arrangements (sometimes referred to as two "channels"). However, in the case of a single wire transmission line probe, the normally poor matching (typically a reflection factor of −3 dB) would deteriorate the isolation. The solution according to the present invention therefore also includes a matching arrangement between the probe and the electrical feed-through. Such a matching arrangement is known per se, and has been suggested in other applications. However, the present invention is based on the realization that a combination of a power divider with a matching arrangement is necessary to allow multiple channels on one single wire transmission line probe, as the isolation of the power divider otherwise would be destroyed by the very strong mismatch reflection (−3 dB when the single wire probe is connected to 50 ohm) where the single wire probe is connected.

In many other radar level gauging applications a power divider such as a Wilkinson power divider (essentially a stepped impedance transformer) could be directly matched to the impedance of the single line, but for the guided wave radar level gauging application the sealed suspension of the probe typically has relatively low impedance. The relationship between the impedance of the probe in free space and the impedance of the electrical feed-through (facing the tank) may be four times, five times, six times, or even more. For example, the impedance of the electrical connection through the process seal may be less than 50 ohm or even less than 40 ohm, while the impedance of the probe in free space in the tank may be more than 200 ohm, or even more than 350 ohm. As an example, a non-coated single wire probe with a diameter of 4-10 mm has an impedance in the range 300-400 ohm in free space for relevant operating frequencies.

According to preferred embodiments, the signal isolation provided by the power divider is such that said first and second circuitry arrangements are functionally independent. This means that the isolation is sufficient to allow specified function for one of the gauges under any type of failure on the other gauge(s). As mentioned in the background, the two gauges may be part of different systems (e.g. one system for level gauging and one system for high level supervision) with totally independent use. In preferred embodiments, the isolation is at least 15 dB, or at least 20 dB.

The provision of sufficient isolation between the circuitry arrangements ensures little or no leakage between the channels. As a consequence, it is not necessary that the first and second electromagnetic signals are distinguishable from each other. In fact, according to a preferred embodiment, the first and second electronics units are designed to transmit substantially identical electromagnetic signals, i.e. signals having the same frequency and amplitude behavior. It is noted that the two circuitry arrangements typically are not used exactly simultaneously. However, the design according to the invention intends to minimize mutual interference. Even if the two arrangements are used in different overall systems (such as level measurement and overfill detection) interference needs to be avoided.

In this case the circuitry arrangements may be functionally identical, and most preferably multiple samples from the same manufacturing process. This makes the system efficient to manufacture. Two substantially identical units are simply connected to the power divider, which is connected to the single line transmission line probe via the matching arrangement.

Each circuitry arrangement preferably includes a power limiting power supply interface for receiving electrical power. This interface can provide drive power to the first and second circuitry arrangements in such a way that intrinsically safe operation is ensured. By thus restricting the power available to each circuitry arrangement, the potential risks of cross-talk is further reduced. Even if one circuitry arrangement provides an erroneous signal which resembles a surface echo, this signal will be limited to a very short distance range and to cases where a very weak signal is measured by the correct transmitter.

According to one embodiment, the circuitry arrangements have at least one variable operation parameter. Such a variable operation parameter may be changed at pre-scheduled points in time, or be changed in response to control signals received over a signal interface. By changing a variable operational parameter, such as the pulse repetition frequency in a pulsed radar level gauge, it is possible to eliminate interfering signals from a non-functional circuitry arrangement even in rare cases where the 20 dB isolation may not be quite sufficient.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

In the present detailed description, various embodiments of the radar level gauge system according to the present invention are mainly discussed with reference to radar level gauge systems using pulsed signals and filling level determination by means of measuring the time between transmitted and reflected pulses. However, the teachings of the present invention are potentially also applicable using other radar techniques. When pulses modulated on a carrier are used, phase information can also be utilized.

Figure 1:
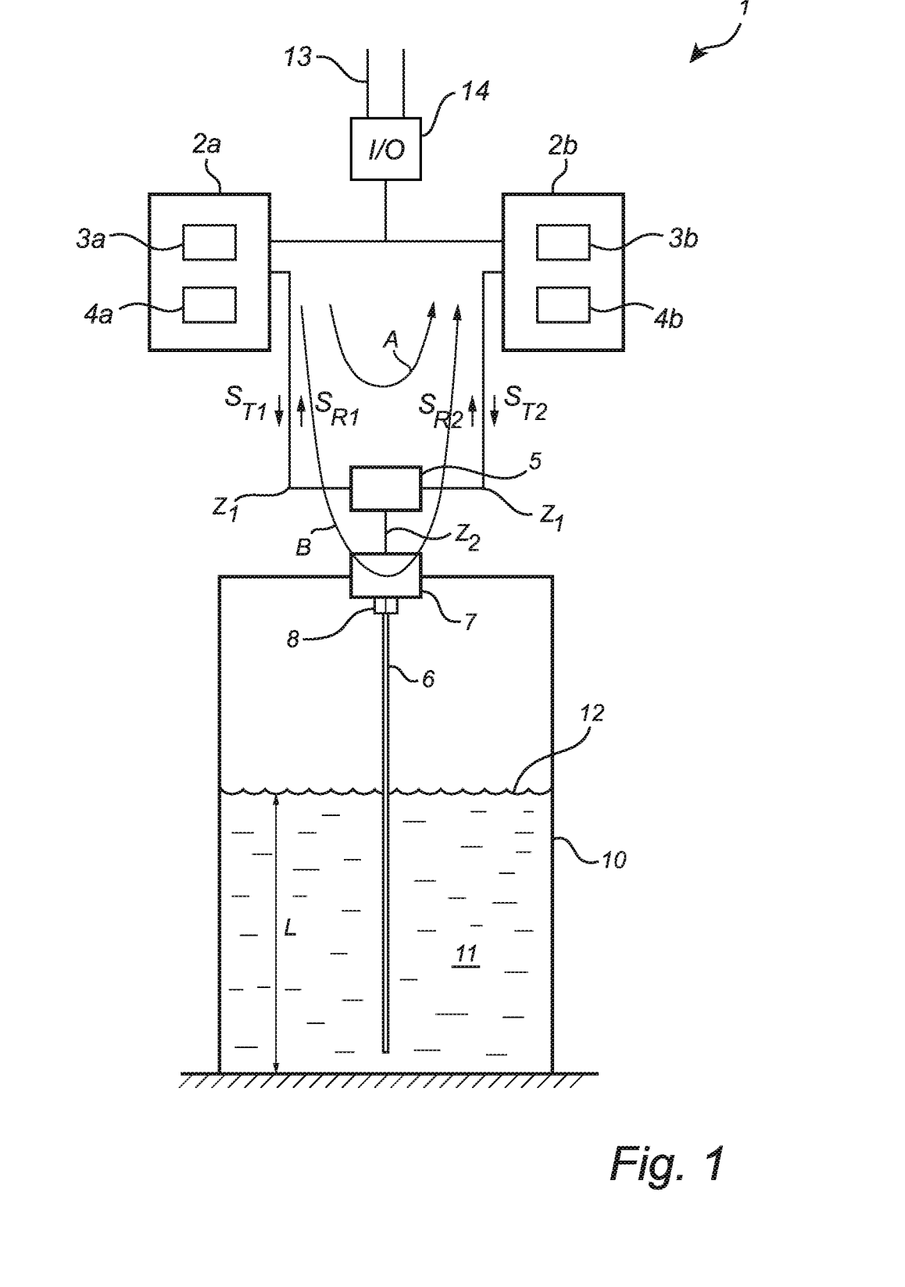
FIG. 1 schematically shows a radar level gauge according to an embodiment of the present invention.

FIG. 1 schematically illustrates a radar level gauge system 1 according to an embodiment of the present invention, comprising at least two measurement electronics units 2a, 2b, each including a circuitry arrangement with transceiver circuitry 3a, 3b connected to processing circuitry 4a, 4b. Each transceiver circuitry 3a, 3b is connected to a power divider 5 which will be described in more detail below. The power divider is connected to a single wire transmission line probe 6 via a tank feed-through structure 7 and a matching arrangement 8. The radar level gauge system 1 is mounted on a tank 10, which is partly filled with a product 11 to be gauged. The probe extends into the product 11.

With this design, there are essentially two different ways a signal may leak from one circuitry arrangement 2a to another 2b. Firstly, there may be an internal leakage through the power divider 5. This is indicated by arrow A in FIG. 1. Secondly, there may be a leakage through the power divider of a reflection caused by a mismatch between the probe and the tank feed through 7. This is indicated by arrow B in FIG. 1.

The level gauge 1 is, furthermore, connectable to external communication lines 13 for analog and/or digital communication via an interface 14. Moreover, the radar level gauge system 1 is typically connectable to an external power source, or may be powered through the external communication lines 13. Alternatively, the gauge may communicate wirelessly using e.g. a Wireless HART protocol, and use a local power supply (not shown) with batteries or other means of scavenging energy for autonomous operation.

Regardless of the type of power source, the power supply of the circuitry arrangements 2a, 2b is preferably made in an intrinsically safe manner. In many applications, where the level gauge is installed in an explosion risk environment, such intrinsically safe power supply is a safety requirement. An intrinsically safe power supply means, inter alia, that current and voltage are limited below given limits. With such a limitation of the input voltage and current the output of radar signal is also limited in a very reliable way. Thus a malfunctioning circuitry has only a limited capability to create a disturbing signal which could affect the other electronic unit connected to the same probe. The limited power available simply restricts the signal strength of any erroneous signal from a malfunctioning gauge.

In operation, the first transceiver circuitry 3a transmits a first electromagnetic transmit signal $S_{T1}$ which is guided by the probe 6 into the tank and is reflected by the impedance transition caused by the surface 12. A reflected signal, referred to as a first echo signal $S_{R1}$, is guided by the probe 6 back to the transceiver circuitry 3a. Due to the normal function of the power divider there will be a power loss of 50% in each direction in the communication between an electronic unit 2a and the probe 6. The first processing circuitry 4a determines a distance between a reference position (such as the tank ceiling) and the surface 12 of the product 11, whereby the filling level L or other process variable can be deduced. It should be noted that, although the tank 10 here contains a single product 11, the distance to any material interface along the probe can be measured in a similar manner.

Analogously, the second transceiver circuitry 3b transmits a second electromagnetic transmit signal $S_{T2}$ which is guided by the probe 6 into the tank and is reflected by the impedance transition caused by the surface 12. A reflected signal, referred to as a second echo signal $S_{R2}$, is guided by the probe 6 back to the transceiver circuitry 3b. The second processing circuitry 4b determines a process variable in the same way as the first processing circuitry 4a.

A power divider (in two or more parts) is a common component and may be realized as coupled transmission lines or branch-line couplers. For a 1:2 bandwidth three λ/4-steps will give good isolation and matching while a wider bandwidth will need more steps. A power divider may also include a ferrite core transformer.

Figure 2:
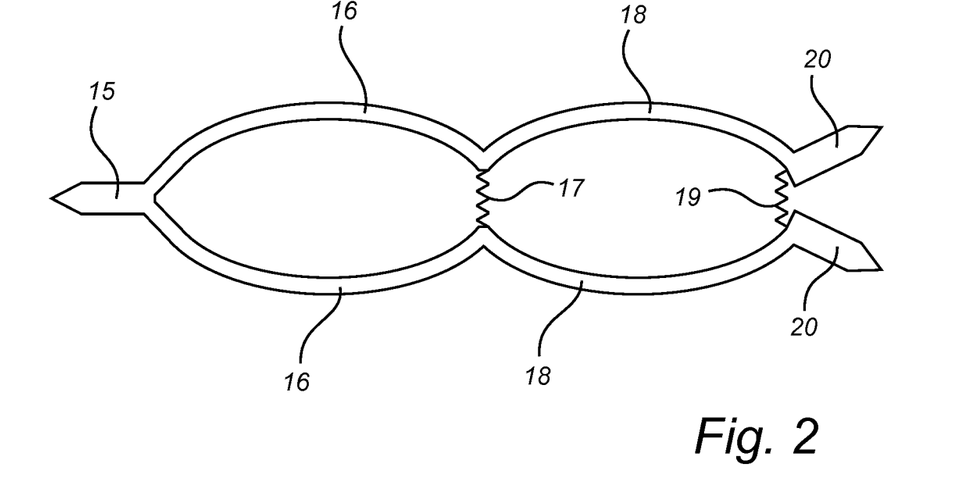
FIG. 2 schematically shows a two-stage Wilkinson power divider.

FIG. 2 shows a simple example of a so called Wilkinson power divider, here with two stages. Such a two stage divider gives good match and low coupling over at least one octave bandwidth, making it useful for systems with limited relative RF bandwidth (such as 1-2 GHz, i.e. a factor 2). Its physical size (circuit board approximately 25 by 70 mm in the illustrated example) is also compatible with the general design parameters of the gauge.

In the example illustrated in FIG. 2, the power divider has an input terminal 15 with an impedance of 50 ohm (indicated by $z_2$ facing the tank feed through structure in FIG. 1). The first stage has two legs 16, each with an impedance of 81 ohm, and a bridge 17 with an impedance of 94 ohm. The second stage has two legs 18, each with an impedance of 62 ohm, and a bridge 19 with an impedance of 100 ohm. Each output terminal 20 has an impedance of 50 ohm (indicated by $z_1$ facing the circuitry arrangements in FIG. 1). The physical size of this divider is approximately 25 mm by 70 mm. In the frequency range 0.9 GHz-2.1 GHz, the illustrated divider will provide isolation between the transceiver circuitry of around −24 dB. The matching against the transceiver circuitry will ideally be around −37 dB.

Figure 3:
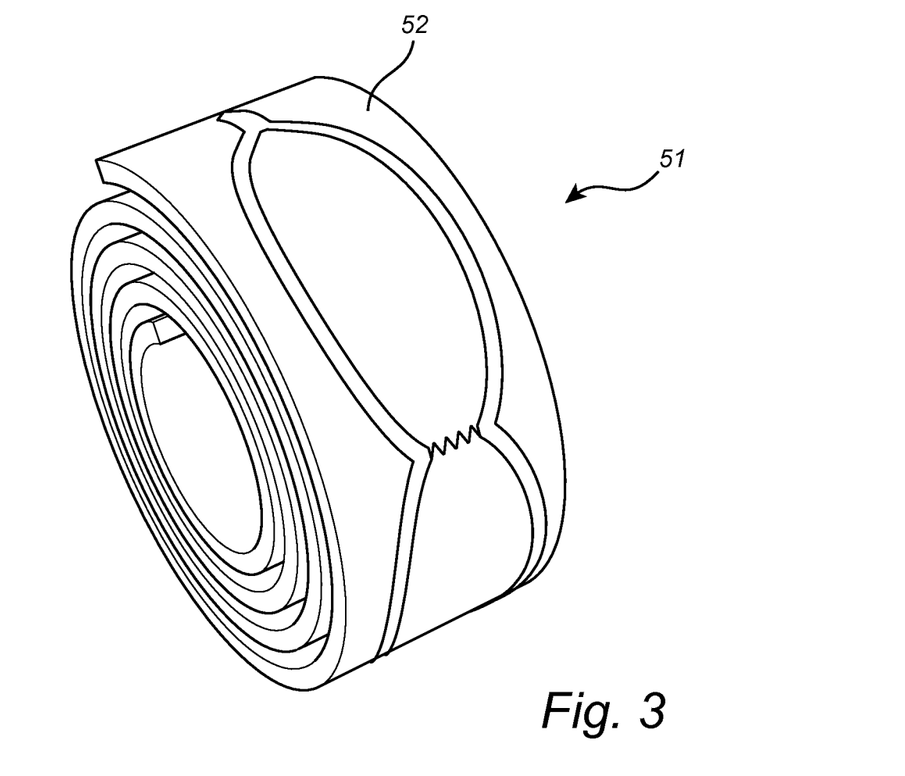
FIG. 3 shows a perspective view of a rolled-up design for a broad band Wilkinson power divider.

For a pulsed radar level gauge system of the guided wave radar (GWR) type, pulses having a pulse width of about 1 ns may typically be used. A ns pulse generally corresponds to a frequency range of about 0.1 GHz to 1 GHz. With such large relative bandwidth (a factor 10), a Wilkinson power divider with more stages will be required. With conventional design, a Wilkinson power divider with many stages will become problematically long, and a special design may be required. FIG. 3 shows an example of a Wilkinson power divider 51 formed on a flexible substrate 52, such as a flexible PCB. The substrate may be rolled up in its longitudinal direction, to form a more compact component. With this design, a broad band power divider may be fitted into a small space, and a Wilkinson power divider with e.g. six stages or more becomes feasible.

Figure 4:
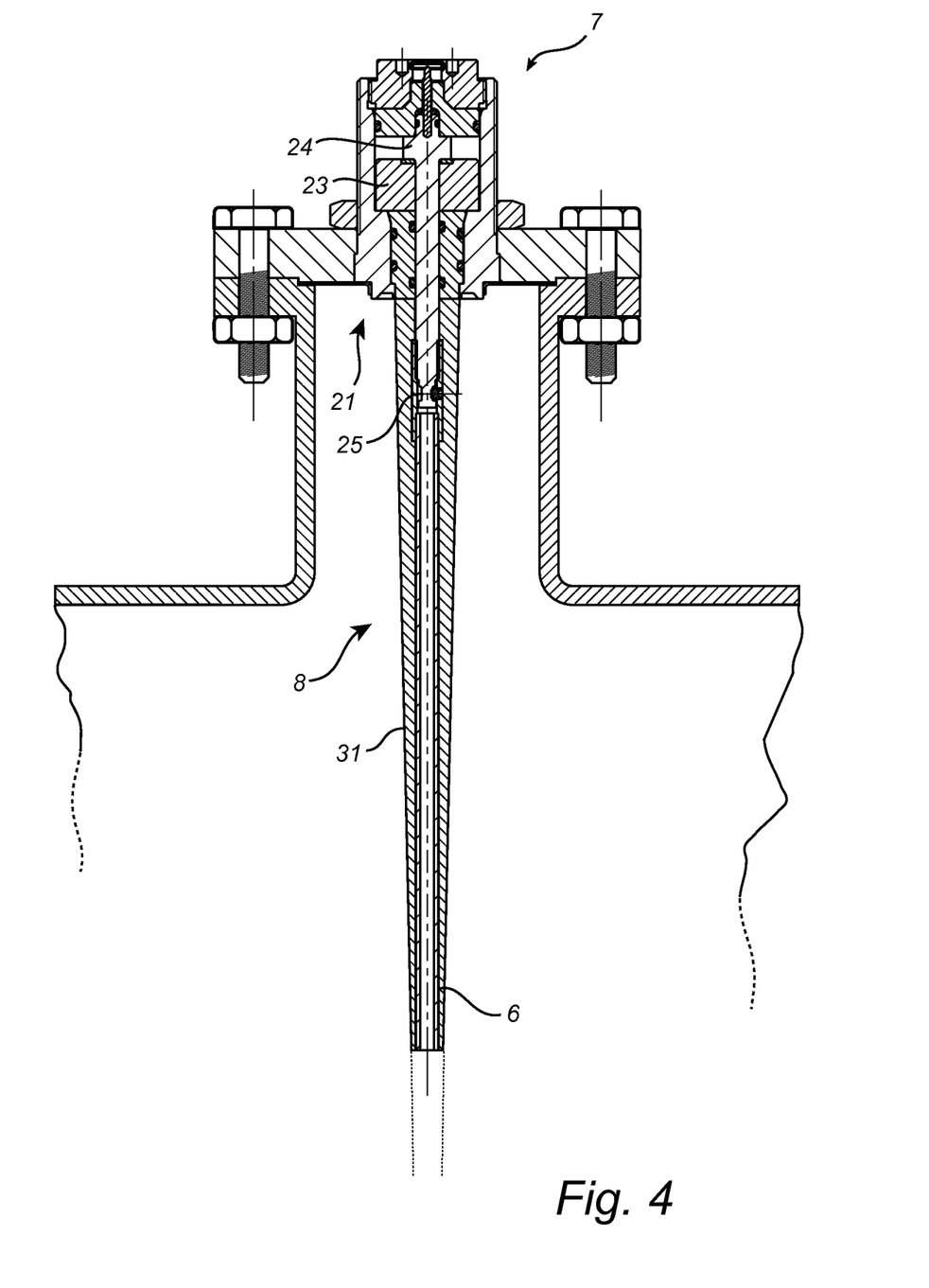
FIG. 4 shows an example of a tank feed through structure.

An example of a tank feed through structure 7 is shown in FIG. 4. The feed through structure includes a process seal 21 providing a sealed electrical connection through the tank wall 22. For this purpose, the tank seal 21 here comprises a sealing element 23 in the form of a dielectric annular sleeve arranged around a central conductor 24. The tank feed through structure 8 also serves as suspension for the probe 6 extending into the tank. For this purpose, the feed through structure 8 illustrated in FIG. 4 has a probe connection terminal 25 where the probe 6 may be attached. In a typical application, the force exerted by the probe on this terminal 25, and thus on the process seal 21, is significant, and may be in the order of several tonnes. Therefore, the dimensions of the central conductor 24 and the annular sleeve 23 is normally rather robust, and as an example the conductor 24 may have a diameter of 4.8 mm. As a result, the process seal 21 in effect is a coaxial connection with a relatively low impedance, typically in the order of 50 ohm.

The single wire transmission line probe can be formed by a single integral conductor which may or may not be covered by a dielectric coating (a so called Goubau line). In many applications, however, the probe is a steel wire having a plurality of metal threads twined together. In free space inside the tank typically has an impedance several times greater than the process seal 21, and a typical value may be 350 ohm, The connection of the probe 6 to the process seal 21 therefore typically creates an impedance transition between a low impedance coaxial connection and the impedance of the single wire transmission line probe in free space (i.e. the free space impedance of the probe). This impedance transition will provide a reflection, which may interfere with the surface reflection. The matching arrangement 8 is arranged to remove or reduce this impedance transition. In general, it is desirable to reduce the impedance transition to such an extent that a reflection caused by the transition is weaker than a reflection caused by an oil surface in the tank. A reflection from the impedance transition may also cause leakage between the circuitry arrangements, as mentioned above with reference to arrow B in FIG. 1. The matching arrangement thus serves to reduce this type of leakage.

It the context of the invention, the matching arrangement relates to any elements provided between the sealed electrical feed-through and the single wire transmission line probe in free space inside the tank. In reality, as will be discussed below, the matching arrangement is often a device arranged around the single wire transmission line. The upper part of the probe will then have an impedance gradually increasing until the "free space impedance".

Possible matching arrangements are known in the art, and discussed in e.g. U.S. 7,636,059, hereby incorporated by reference. In the example in FIG. 4, the arrangement includes a hollow, conically shaped dielectric member 31 provided around the single wire probe 6.

Figure 5:
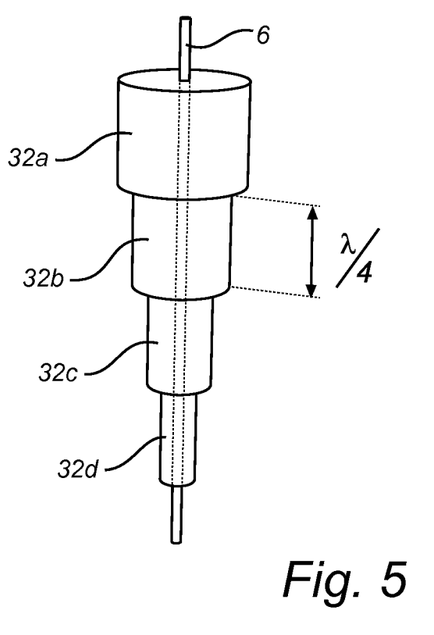
FIG. 5 shows an example of an alternative matching arrangement.

In FIG. 5 the arrangement comprises four cylindrical segments 32a-d with decreasing diameter towards the free end of the single line probe 6. Each cylindrical segment 32a-d may advantageously have a length of about a quarter of a wavelength of the center frequency of the signal to be transmitted by the transceiver 3a, 3b. Hereby, a wideband impedance transition can be achieved. Providing a longer impedance matching device with additional cylindrical segments, an even larger bandwidth can be achieved. This may be particularly advantageous in the case of pulsed radar level gauging, as discussed above.

Various matching arrangement designs are known both dielectric and metallic. The stepped transformer generally is the shortest design for a required maximum mismatch but a continuous change is better in case the oil level partly covers the transformer. In any case the reflection from the transformer should be designed to be well below the reflex from an oil surface which is around −15 dB. As an example, the attenuation may be between −20 dB and −24 dB.

In most situations, the isolation between the circuitry arrangements in combination with conventional input power limitation ensures that a disturbance from one circuitry arrangement is unlikely to reach noticeable levels for another circuitry arrangement. However, for safety reasons even unlikely conditions should be eliminated, and for this purpose, the circuitry arrangements may have at least one variable operation parameter. For example, in a pulsed radar level gauge the pulse repetition frequency (PRF) may be variable within given limits without significantly affecting the performance of the gauge. If such a variable parameter is changed, it will be possible for a circuitry arrangement to distinguish actual signals from any interfering signals (which will be extremely unlikely to display the same change in this parameter at the same time).

In one embodiment, one or several operation parameters are changed according to a pre-defined schedule. According to another embodiment, a parameter may be changed in response to control signals received by the level gauge. Note that all circuitry arrangements can change parameters simultaneously. The purpose is not primarily to distinguish two functional circuits from one another, but only to distinguish functional circuitry (which complies with the parameter change) from non-functional circuitry (which does not comply with the parameter change). A robust method would be to change between three values of the changed parameter (which ideally should all give the same final result) and select the middle result. If one of the three measurements result in an erroneous, and strongly deviating, value, the selected value will still be correct. Of course, if two consecutive measurements provide identical or similar results, a third measurement may be unnecessary.

The person skilled in the art realizes that the present invention by no means is limited to the preferred embodiments described above. On the contrary, many modifications and variations are possible within the scope of the appended claims. For example, a Wilkinson power divider and impedance transformers can be made with a wide range of details depending on required parameters.

What is claimed is:

1. A level gauge for detecting process variables related to a distance to a surface of a content in a tank, said level gauge comprising:
   a first circuitry arrangement comprising first transceiver circuitry for transmitting first electromagnetic transmit signals and receiving first electromagnetic echo signals, and first processing circuitry connected to the first transceiver circuitry for determining a first process variable,
   a second circuitry arrangement comprising second transceiver circuitry for transmitting second electromagnetic transmit signals and receiving second electromagnetic echo signals, and second processing circuitry connected to the second transceiver circuitry for determining a second process variable,
   a power divider electrically connected to said first transceiver circuitry and to said second transceiver circuitry to provide signal isolation between said first transceiver circuitry and said second transceiver circuitry,
   a process seal providing a sealed electrical feed-through from said power divider through a tank wall, said electrical feed-through having an electrically matched connection with said power divider,
   a single wire transmission line probe mechanically suspended by said process seal and extending into the content in the tank, said single wire transmission line probe being adapted to guide said first and second transmit signals towards and into the content, and to guide reflected signals back to the first and second circuitry arrangements,
   said electrical feed-through having a first input impedance as seen from the probe, said single wire transmission line probe having a second input impedance as seen from said electrical feed-through, said second input impedance being greater than said first input impedance, and
   a matching arrangement providing an electrically matched connection between said electrical feed-through and said single wire transmission line probe.

2. The level gauge according to claim 1, wherein said single wire transmission line probe is configured to only allow propagation of signals having one and the same propagation mode.

3. The level gauge according to claim 1, wherein said second input impedance is at least four times greater than said first impedance.

4. The level gauge according to claim 1, wherein said second input impedance is at least seven times greater than said first impedance.

5. The level gauge according to claim 1, wherein said first input impedance is less than 50 ohm.

6. The level gauge according to claim 1, wherein said second input impedance is greater than 200 ohm.

7. The level gauge according to claim 1, wherein said power divider provides isolation between said first and second transceiver circuitry such that said first and second circuitry arrangements are functionally independent.

8. The level gauge according to claim 1, wherein said power divider provides isolation between said first and second transceiver circuitry of at least 15 dB.

9. The level gauge according to claim 1, wherein said power divider provides isolation between said first and second transceiver circuitry of at least 20 dB.

10. The level gauge according to claim 1, wherein said first electromagnetic transmit signal and said second electromagnetic transmit signal are substantially identical.

11. The level gauge according to claim 10, wherein said first and second circuitry arrangements are functionally identical.

12. The level gauge according to claim 1, wherein said circuitry arrangements have at least one variable operation parameter.

13. The level gauge according to claim 12, wherein said at least one variable operation parameter includes one of pulse repetition frequency and sweep time.

14. The level gauge according to claim 1, wherein said transmit signals comprises a series of pulses with a duration in the order of nanoseconds.

15. The level gauge according to claim 1, further comprising a power limiting power supply interface for receiving electrical power, said interface providing drive power to said first and second circuitry arrangements in such a way as to ensure intrinsically safe operation.

16. The level gauge according to claim 1, wherein said power divider is one of a Wilkinson power divider and a transformer power divider.

17. The level gauge according to claim 16, wherein said Wilkinson power divider is formed on an elongated flexible carrier rolled up in its longitudinal direction.

18. The level gauge according to claim 1, wherein said power divider includes a ferrite core transformer.

19. The level gauge according to claim 1, wherein said process seal comprises a central conductor and a dielectric sleeve surrounding said central conductor.

20. A method for detecting process variables related to a distance to a surface of a content in a tank, said method comprising the steps of:
   transmitting a first electromagnetic transmit signal,
   transmitting a second electromagnetic transmit signal,
   supplying said first and second transmit signals to a sealed electrical feed-through in a tank wall, while ensuring electrical isolation between said first and second transmit signals,
   electrically matching an input impedance of said electrical feed-through and an input impedance of a single wire transmission line probe extending into the content in the tank,
   feeding said first and second transmit signals from said electrical feed-through to said single wire transmission line probe,
   guiding said first and second transmit signals along the probe towards and into the content,
   guiding first and second reflected electromagnetic echo signals along the probe in the same propagation mode back to the electrical feed-through,
   ensuring electrical isolation between said first and second echo signals,
   receiving said first echo signal,
   receiving said second echo signal, and
   determining first and second process variables based on relationships between said first transmit signal and said first echo signal, and said second transmit signal and said second echo signal, respectively.

21. The method according to claim 20, wherein said first and second transmit signals, and said first and second echo signals propagate along said single wire transmission line probe in one and the same propagation mode.

22. The method according to claim 20, further comprising varying at least one operation parameter during the steps of transmitting.

23. The method according to claim 22, wherein said at least one operation parameter includes one of pulse repetition frequency and sweep time.

24. The method according to claim 20, wherein said transmit signals comprises a series of pulses with a duration in the order of nanoseconds.

* * * * *